United States Patent
Jo et al.

(10) Patent No.: US 10,985,817 B2
(45) Date of Patent: Apr. 20, 2021

(54) BEAMFORMING TRAINING

(71) Applicant: LG ELECTRONICS INC., Seoul (KR)

(72) Inventors: Kyungtae Jo, Seoul (KR); Jinmin Kim, Seoul (KR); Sungjin Park, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 16/303,606

(22) PCT Filed: Mar. 31, 2017

(86) PCT No.: PCT/KR2017/003536
§ 371 (c)(1),
(2) Date: Nov. 20, 2018

(87) PCT Pub. No.: WO2017/204457
PCT Pub. Date: Nov. 30, 2017

(65) Prior Publication Data
US 2020/0322014 A1    Oct. 8, 2020

Related U.S. Application Data

(60) Provisional application No. 62/409,412, filed on Oct. 18, 2016, provisional application No. 62/385,223, (Continued)

(51) Int. Cl.
*H04L 1/02* (2006.01)
*H04B 7/06* (2006.01)
*H04B 7/0491* (2017.01)

(52) U.S. Cl.
CPC ............. *H04B 7/06* (2013.01); *H04B 7/0491* (2013.01)

(58) Field of Classification Search
CPC ....... H04L 1/0618; H04L 1/06; H04L 5/0092; H04L 5/0053; H04B 7/0452; H04B 7/088; H04W 26/18; H04W 74/085
(Continued)

(56) References Cited

U.S. PATENT DOCUMENTS

2015/0244432 A1    8/2015  Wang
2017/0118656 A1*   4/2017  Xin .................... H04B 7/0619
(Continued)

FOREIGN PATENT DOCUMENTS

KR    1020160049461    5/2016
WO    2014074894       5/2014

OTHER PUBLICATIONS

PCT International Application No. PCT/KR2017/003536, International Search Report dated Jun. 29, 2017, 4 pages.
(Continued)

*Primary Examiner* — Khai Tran
(74) *Attorney, Agent, or Firm* — Lee, Hong, Degerman, Kang & Waimey

(57) ABSTRACT

A method for beamforming training and a device using the same are provided. A station (STA) receives a beacon frame from an access point (AP) during a beacon transmission interval (BTI). The beacon frame includes information on a sector sweep (SSW) frame type used in at least one of a plurality of SSW slots. During association beamforming training (A-BFT), the STA transmits the SSW frame according to the SSW frame type from an SSW slot, among a plurality of SSW slots, having succeeded in a random backoff.

9 Claims, 7 Drawing Sheets

Related U.S. Application Data filed on Sep. 8, 2016, provisional application No. 62/384,199, filed on Sep. 7, 2016, provisional application No. 62/339,966, filed on May 23, 2016.

(58) Field of Classification Search
USPC .......................................... 375/267, 260, 130
See application file for complete search history.

(56) References Cited

U.S. PATENT DOCUMENTS

| | | | |
|---|---|---|---|
| 2017/0134145 A1* | 5/2017 | Xin | H04L 5/0048 |
| 2018/0123665 A1* | 5/2018 | Oh | H04B 7/088 |
| 2018/0131421 A1* | 5/2018 | Chen | H04B 7/0695 |

OTHER PUBLICATIONS

Nitsche, et al., "IEEE 802.11ad: Directional 60 GHz Communication for Multi-Gbps Wi-Fi", In: IEEE Communication Magazine, vol. 52, issue: 12, Dec. 11, 2014, 11 pages.

Xin, et al., "Channel Access in A-BFT over Multiple Channels", IEEE 802.11-16/0101r0, Jan. 2016, 9 pages.

\* cited by examiner

BEAMFORMING TRAINING

CROSS-REFERENCE TO RELATED APPLICATIONS

This application is the National Stage filing under 35 U.S.C. 371 of International Application No. PCT/KR2017/003536, filed on Mar. 31, 2017, which claims the benefit of U.S. Provisional Application No. 62/339,966, filed on May 23, 2016, 62/384,199, filed on Sep. 7, 2016, 62/385,223, filed on Sep. 8, 2016 and 62/409,412, filed on Oct. 18, 2016, the contents of which are all hereby incorporated by reference herein in their entirety.

BACKGROUND OF THE INVENTION

Field of the Invention

The present invention relates to wireless communication and, more particularly, to beamforming training in a wireless communication system.

Related Art

An institute of electrical and electronics engineers (IEEE) 802.11ad standard is a high-speed wireless communication protocol operating at a band of at least 60 GHz. Although a signal reaches in the range of about 10 meters, a throughput to be supported may be at least 6 Gbps. Since it operates at a high frequency band, signal propagation is dominated by ray-like propagation. The more the transmit (TX) or receive (RX) antenna beam aligned towards a strong spatial signal path, the better the signal quality may be.

The IEEE 802.11ad standard provides a beamforming training process for antenna beam alignment. IEEE 802.11ay is a next-generation standard which is being developed aiming at a throughput of at least 20 Gbps.

One of requirements discussed in the IEEE 802.11ay is to support a multi-channel and a bonding channel. A method for applying an operation using a single channel to the multi-channel is provided.

SUMMARY OF THE INVENTION

The present invention provides a method for beamforming training that supports various types of sector sweep (SSW) frames and a device using the same.

In an aspect, a method for beamforming training in a wireless communication system includes receiving, by a station (STA), a beacon frame from an access point (AP) during a beacon transmission interval (BTI) and transmitting, by the STA, an SSW frame according to the type of the SSW frame in an SSW slot having succeeded in a random backoff among a plurality of SSW slots during association beamforming training (A-BFT). The beacon frame includes association beamforming training (A-BFT) length representing a number of the plurality of sector sweep (SSW) slots within an A-BFT and an FSS field representing a number of SSW frames allowed per SSW slot. The beacon frame includes information on a type of an SSW frame used in at least one SSW slot of the plurality of SSW slots.

The type of the SSW frame may indicate one of a first-type SSW frame and a second-type SSW frame, and the first-type SSW frame and the second-type SSW frame may have different sizes.

In another aspect, a device for beamforming training in a wireless communication system includes a transceiver to transmit and receive a radio signal, and a processor connected to the transceiver. The processor is configured to control the transceiver to receive a beacon frame from an access point (AP) during a beacon transmission interval (BTI) and control the transceiver to transmit an SSW frame according to the type of the SSW frame in an SSW slot having succeeded in a random backoff among a plurality of SSW slots during association beamforming training (A-BFT).

A station (STA) may be provided with more opportunities to participate in beamforming for the same length of time, thereby reducing time for beamforming training.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user.

A Basic service set (BSS) is a building block of the wireless local area network (WLAN) based on the IEEE 802.11 standard. The BSS may include a plurality of STAs which perform direct communication with each other. The WLAN may provide two types of sets, for example, independent BSS (IBSS) and personal BSS (PBSS). The IBSS may be a basic type. The PBSS may be a type of wireless local area network (WLAN), in which the respective STAs communicate directly with each other, as an ad-hoc network. A STA in the PBSS may perform a role of the PBSS control point (PCP). The PCB may provide a beacon transmission, a service period (SP) allocation, etc.

An access point (AP) may be an entity which provides a connection (or association) between multiple BSSs. One STA in the PBSS may perform a role of the AP and another STA that belongs to different BSSs may communicate through the AP. The AP may manage the beacon transmission and association (or association response). Hereinafter, the AP and the PCP, which are not divided separately, may be referred to as a "AP".

The STA may include non-AP STA or AP unless a STA function and an AP function are divided separately. When a communication between the STA and the AP is described, the STA may be interpreted as the non-AP STA. When a communication between a STA and a STA is described or when the AP function is not required separately, the STA may be the non-AP STA or the AP.

Figure 1:
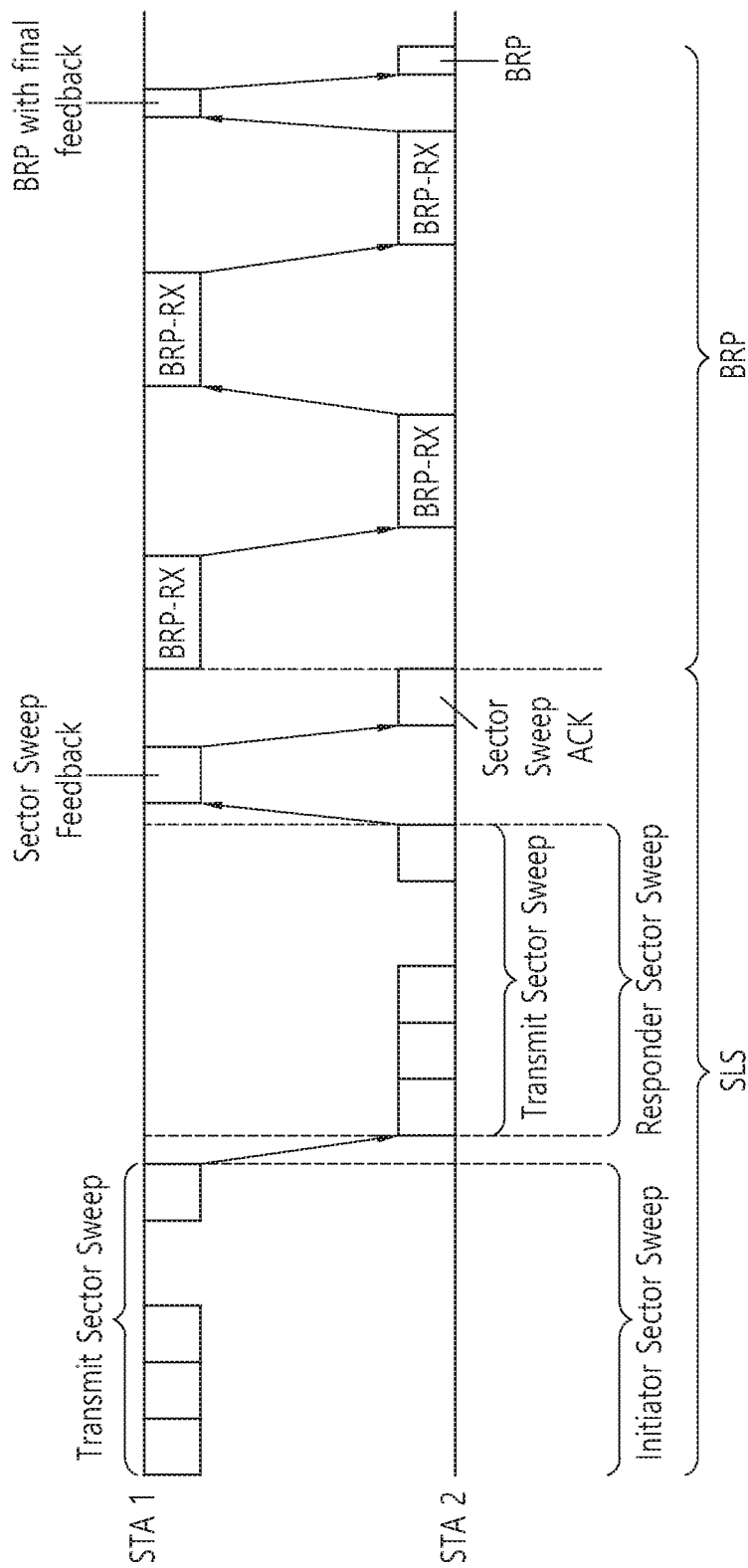
FIG. 1 shows a conventional beamforming training procedure.

FIG. 1 shows a conventional beamforming training procedure. This procedure may refer to section 9.35 of the IEEE 802.11ad standard.

A STA1 may be an initiator that initiates beamforming (BF) training. A STA2 that participates in the BF training may be a responder.

The BF training provides a transmission of a BF training frame using a sector sweep (SSW) and a signaling required for each STA to determine setting an appropriate antenna system. The BF training process may include a sector level sweep (SLS) process and a beam refinement protocol (BRP) process. The SLS process for the sector sweep may allow communication between the STAs to provide a control physical layer (PHY). The BRP process provides a refinement of an antenna weight vector between the transmitter and the receiver.

The BF training may be initiated by the initiator from the SLS process. The SLS process may include an initiator sector sweep (ISS) for training an initiator link, a responder sector sweep (RSS) for training a responder link, a sector sweep (SSW) feedback, and a SSW ACK.

During the ISS process, the initiator may transmit each frame (a beacon frame or a SSW frame) to each of the sectors which the initiator has. During the RSS process, the responder may transmit each of the SSW frames to each of the sectors which the responder has. During the SSW process, the initiator may send a SSW feedback frame to the responder. The SSW feedback frame may include information about a sector and an antenna which are selected by the initiator. The SSW ACK frame may be transmitted through a sector included in the SSW feedback frame which is most recently received and the antenna.

A sector may correspond to a specific antenna beam or pattern. A transmit (TX) sector may be a sector for a TX antenna, and a receive (RX) sector may be a sector for a RX antenna.

A sector (a TX sector and/or a RX sector) in which an initiator has the best quality and a sector (a TX sector and/or a RX sector) in which a responder has the best quality may be determined through the SLS process.

When the SLS process is completed, the BRP process for training an RX antenna array and a TX antenna array may be initiated. The BRP process may include a BRP setup subphase, a multiple sector ID detection (MID) subphase, a beam combining (BC) subphase, and the like.

Figure 2:
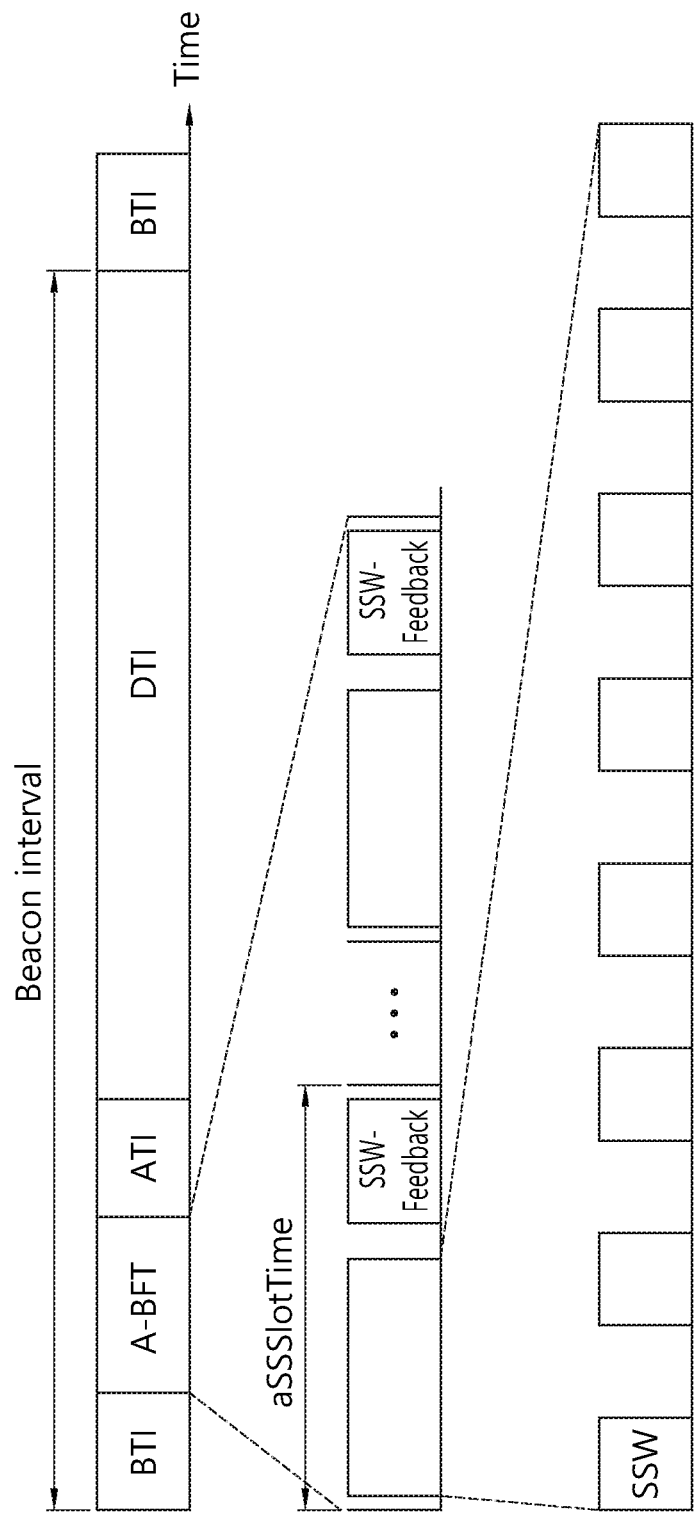
FIG. 2 is a diagram illustrating an example of a SLS process.

FIG. 2 is a diagram illustrating an example of a SLS process.

When an initiator is an AP and a responder is a non-AP STA, a beacon frame may be transmitted during the ISS process. A beacon interval may be a time period in which a beacon frame is transmitted.

A beacon transmission interval (BTI) may be a time interval between the start of a first beacon transmission by the AP in a beacon interval to the end of a last beacon transmission by the AP in the same beacon interval. An association beamforming training (A-BFT) may be a time period including a responder sector sweep (RSS) and a SSW feedback in the SLS process for beamforming (BF). An announcement transmission interval (ATI) may be a time interval for a request-response based management between the AP and the STA. A data transfer interval (DTI) may be a time interval for exchanging data.

The A-BFT is performed by a SSW slot unit, and a length of the A-BFT is defined as an integer multiple length of the SSW slot. A-BFT length information may be included in the beacon frame.

The SSW slot has a length of aSSSlotTime. The aSSSlotTime is defined as follows: aSSSlotTime=aAirPropagationTime+aSSDuration+MBIFS+aSSFBDuration+MBIFS. The aAirPropagationTime is a parameter considering the propagation delay between the initiator and the responder. The aSSDuration is a time for the responder to transmit M SSW frames in the SSW slot. Information about the number M of allowed SSW frames per a SSW slot may be included in the beacon frame.

FIG. 2 is a diagram illustrating a case where M=8. Medium beamforming interframe spacing (MBIFS) represents an interval between the BTI and A-BFT or an interval between ISS, RSS, SSW feedback, and SSW ACK.

At the beginning of each A-BFT, the STA as the responder may invoke a random back-off process to start or resume the RSS. At the beginning of the A-BFT, the STA may randomly select a backoff count from a uniform distribution [0, (A-BFT length−1)]. The STA decrements the backoff counter by one at the end of each SSW slot. The STA initiates RSS in the corresponding SSW slot when the back-off count value is 0 at the start of the SSW slot. In the corresponding SSW slot, the STA may transmit a maximum of M SSW frames. If there are more SSW frames sent by the STA, the RSS may be resumed in the next SSW slot before the A-BFT is finished. If the RSS is not completed before the A-BFT is finished, the backoff process may be performed again before the RSS is resumed in the next A-BFT.

The AP may send a SSW feedback before the SSW slot expires. The information included in the SSW feedback may be based on the SSW frame received in the SSW slot where the SSW feedback is transmitted. The SSW feedback may include information about a sector and an antenna which are selected by the AP.

The STA has an RSS fail count. Although the RSS fail count is performed during an A-BFT(s) period, the RSS fail count may be the number of consecutive times which do not receive the SSW feedback as a response. For example, it may be assumed that an A-BFT period has 8 SSW slots and the STA transmits SSW frames in 4 SSW slots for 2 A-BFT periods. If the STA does not receive the SSW feedback from 3 SSW slots of 4 SSW slots, the value of the RSS fail count may be 3.

When the value of the RSS fail count exceeds the RSS retry limit, the STA may select a random value selected from the uniform distribution [0, RSSBackoff) as a backoff count. The STA may decrement the backoff count by 1, one by one at the end of each A-BFT. When the backoff count reaches zero, the STA may resume the RSS in the A-BFT. When the STA receives the SSW feedback during the A-BFT, the RSS fail count may be set to zero.

Figure 3:
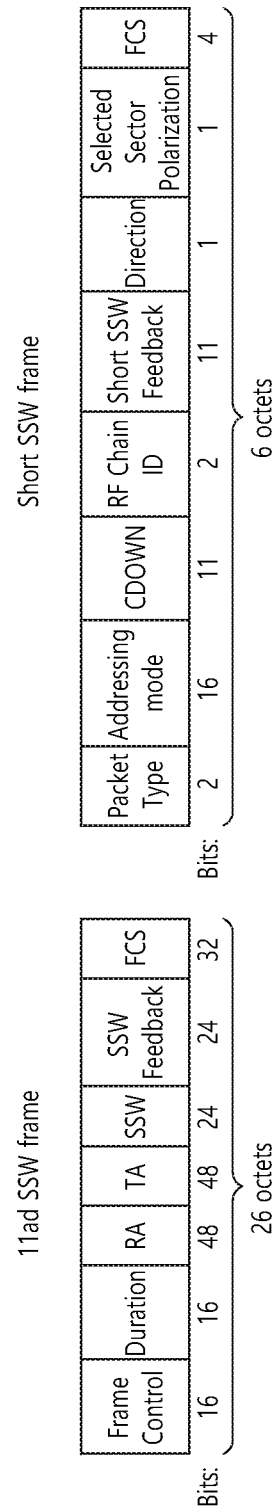
FIG. 3 illustrates various types of SSW frames.

FIG. 3 illustrates various types of SSW frames.

According to the existing IEEE 802.11ad standard, an SSW frame has a fixed size of 26 octets. A short SSW frame having a smaller size is proposed in order to reduce beamforming time. FIG. 3 shows a six-octet short SSW frame. The short SSW frame includes frames illustrated below in Table 1. Not all the fields are necessary, and field names and bit numbers are merely for illustration.

TABLE 1

| Field name | Description |
| --- | --- |
| Packet Type | To indicate the type of this frame. '0' indicates a short SSW. |
| Addressing Mode | To indicate whether this frame is transmitted to a single receiver or a plurality of transmitters. |

TABLE 1-continued

| Field name | Description |
| --- | --- |
| CDOWN | Down-counter to indicate the number of remaining short SSW frames to be transmitted. |
| RF Chain ID | To indicate an RF chain currently used by a transmitter for this transmission. |
| Direction | To indicate whether a transmitter is an initiator or a responder. For example, '0' indicates that this frame is transmitted by an initiator, and '1' indicates that this frame is transmitted by a responder. |
| Short SSW feedback | To indicate the CDOWN value of a short SSW frame received with the best quality in the previous sector sweep. |
| Selected Sector Polarization | To indicate a polarization state used for a short SSW frame received with the best quality in the previous sector sweep. |

Transmission time for the six-octet short SSW is shorter than transmission time for the conventional SSW frame. The characteristics of these two frames are compared in the following table.

TABLE 2

|  | Conventional SSW frame | short SSW frame |
| --- | --- | --- |
| Size | 26 octets | 6 octets |
| Transmission time | 14.91 micro-seconds | 8.8 micro-seconds |
| Interframe spacing (IFS) | 1 micro-seconds (SBIFS) | 1 micro-seconds |

When SSW frames having various transmission times are defined, the number of SSW slots is increased, thus providing an STA to participate in beamforming with more opportunities for contention during A-BFT.

Hereinafter, two types of SSW frames having different sizes are referred to as a first-type SSW frame (SSW-I) and a second-type SSW frame (SSW-II), respectively. The first-type SSW frame may be the existing SSW frame, and the second-type SSW frame may be the short SSW frame. The size of the first-type SSW frame may be larger than that of the second-type SSW frame.

According to the existing IEEE 802.11ad, only one type of SSW frame can be transmitted during A-BFT. A method for transmitting a plurality of types of SSW frames during A-BFT is proposed.

Figure 4:
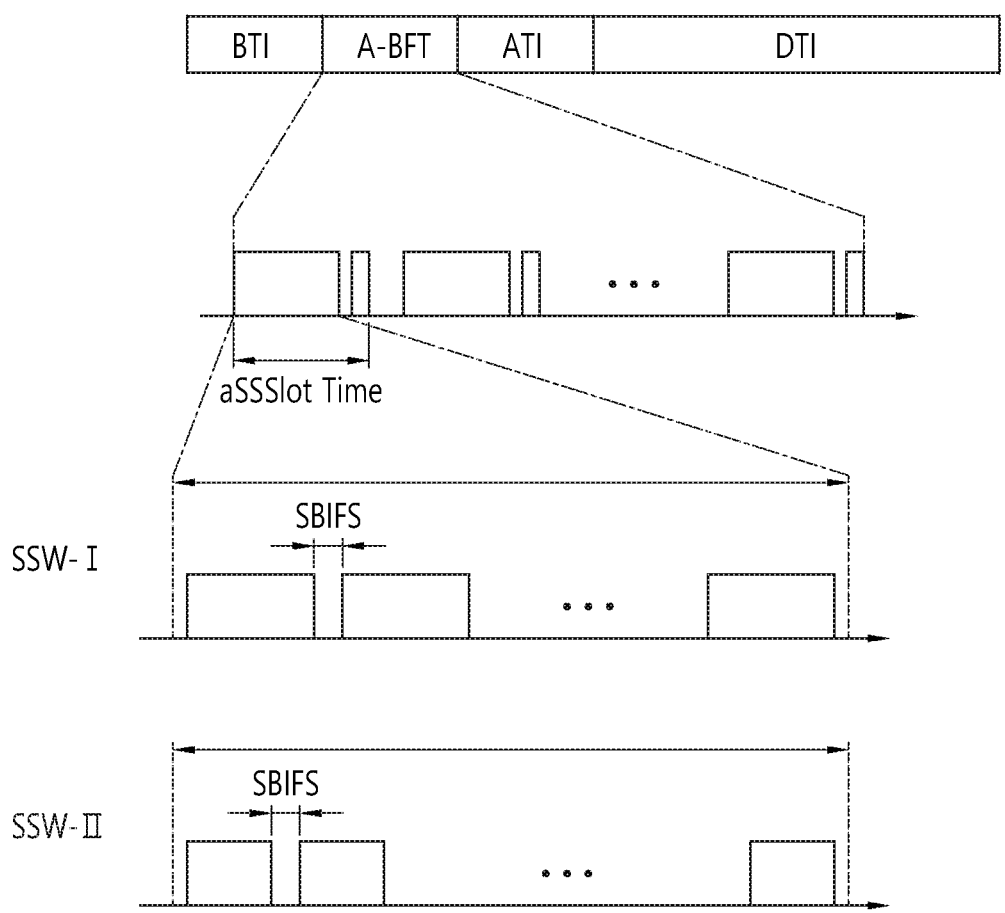
FIG. 4 illustrates beamforming training according to one embodiment of the present invention.

FIG. 4 illustrates beamforming training according to one embodiment of the present invention.

An AP transmits a beacon frame to an STA during a BTI. The beacon frame may include configuration information on the type of an SSW frame transmitted during A-BFT. A-BFT is performed per SSW slot, and A-BFT length is defined as an integer multiple of the SSW slot.

The configuration information on the type of the SSW frame included in the beacon frame is illustrated in the following table. Not all the fields are necessary, and field names are merely for illustration.

TABLE 3

| Field name | Description |
| --- | --- |
| A-BFT length | Size of A-BFT, which may be defined by the number of SSW slots. |
| FSS | Number of SSW frames allowed per SSW slot. |
| SSW frame type | Type of SSW frame transmitted during A-BFT, which may be, for example, SSW-I, SSW-II, or combination thereof. |
| Type allowance | To indicate whether SSW-II is transmitted. |
| Additional slot | To indicate that SSW-II is transmitted in additional SSW. |
| A-BFT length II | Size of additional slot |
| FSS II | Number of SSWs-II allowed per additional slot |

SSW-I or SSW-II may be transmitted during A-BFT according to the configuration information.

The AP and the STA may determine the type of an SSW frame transmitted during A-BFT as follows.

In a first embodiment, the type of the SSW frame may be given depending on the value of the FSS field. For example, the FSS field currently has a maximum value of 6. The STA may determine that SSW-I is transmitted when the FSS field has a value of 16 or less, and may determine that SSW-II is transmitted when the FSS field has a value greater than 16.

In a second embodiment, the type of the SSW frame directly transmitted may be specified through the SSW frame type field and/or the type allowance field. Here, the FSS field is a four-bit field, which can basically be up to 16, and thus may not be suitable to specify the number of SSWs-II having a smaller size. Accordingly, the size of the FSS field is fixed, and the STA can differently interpret the value of the FSS field depending on the type of the SSW frame.

When there are two types of SSW frames according to Table 2, in which the existing SSW frame is SSW-I and the short SSW frame is SSW-II, R=(transmission time of SSW-I)/(transmission time of SSW-II)=1.6. Therefore, when the type of the SSW frame is SSW-I, the value of the FSS field is the number of SSWs-I allowed per SSW slot. When the type of the SSW frame is SSW-II, (the value of the FSS field*R) is the number of SSWs-II allowed per SSW slot. The following table shows transmission time according to the value of the FSS field.

TABLE 4

| FSS (SSW-I) | 1 | 2 | 4 | 8 | 16 |
| --- | --- | --- | --- | --- | --- |
| Transmission time (SSW-I) (micro-seconds) | 15.91 | 31.82 | 63.64 | 127.28 | 254.56 |
| FSS (SSW-II) | 1 | 3 | 6 (7) | 13 (12) | 26 (25) |
| Transmission time (SSW-II) (micro-seconds) | 9.8 | 29.4 | 58.8 (68.6) | 127.4 (117.6) | 254.8 (245) |

Alternatively, a first FSS field for SSW-I and a second FSS field for SSW-II may be separately given.

Figure 5:
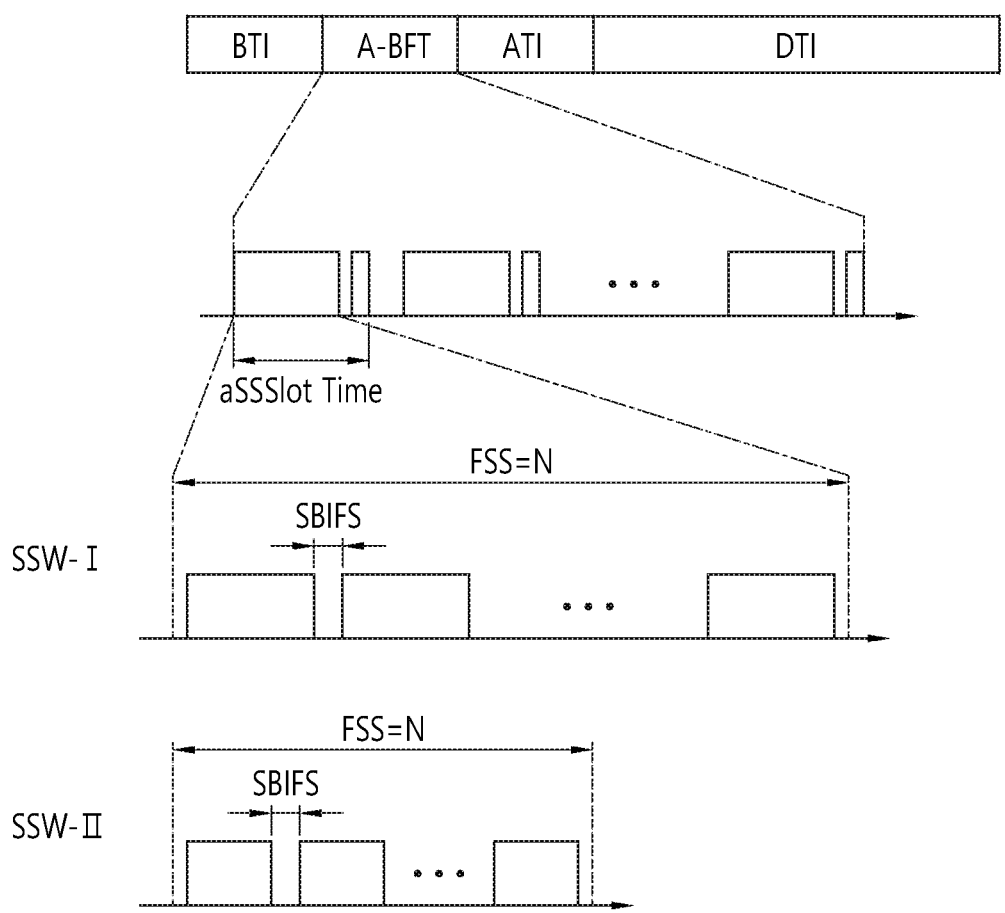
FIG. 5 illustrates the transmission of an SSW frame according to A-BFT length.

In a third embodiment, the type of the SSW frame may be specified depending on A-BFT length. FIG. 5 illustrates the transmission of an SSW frame according to A-BFT length. When the A-BFT length is longer than a specified value, SSW-I may be transmitted. When the A-BFT length is shorter than the specified value, SSW-II may be transmitted.

The foregoing embodiments may be extended to a plurality of A-BFT intervals. When beamforming of a responder has not been completed within one A-BFT interval and one SSW slot, the responder and an initiator exchange information indicating that beamforming has not been completed, and the initiator may re-configure A-BFT for the remaining beamforming. Beamforming of a plurality of responders may be independently performed in a plurality of A-BFT intervals.

Figure 6:
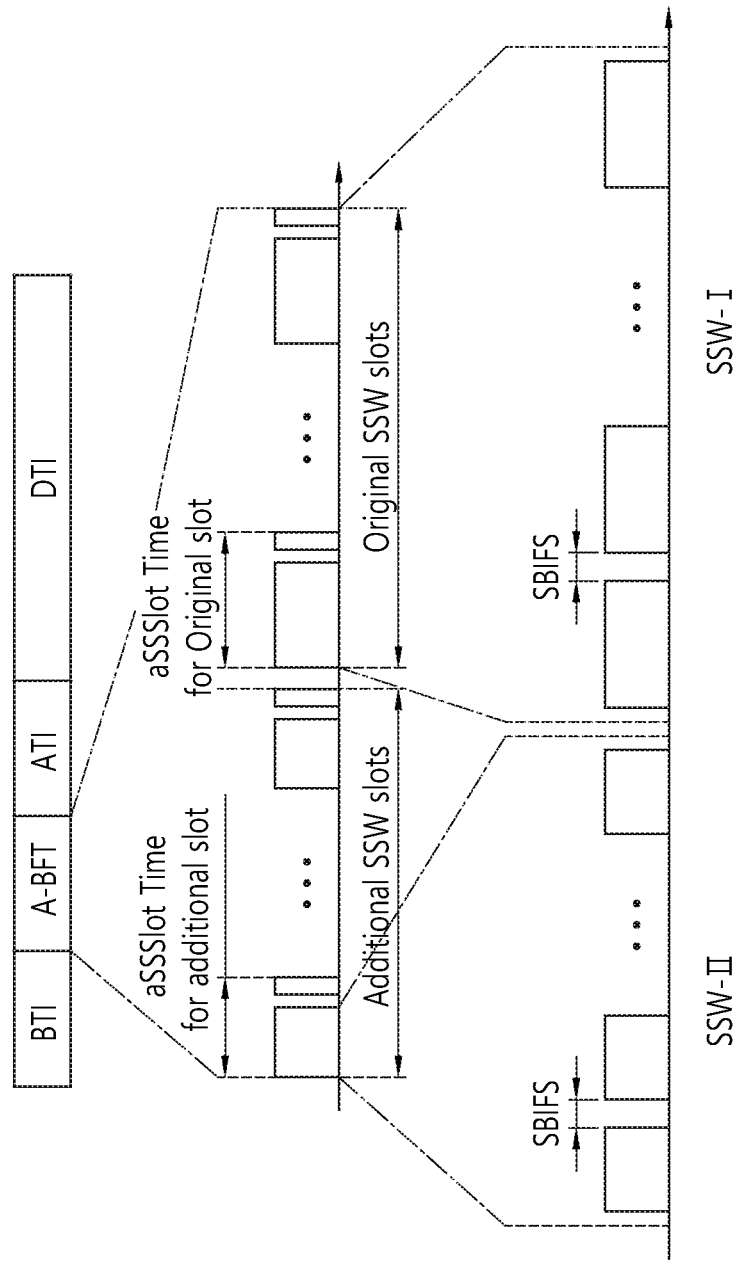
FIG. 6 illustrates an example in which an SSW slot is defined according to the type of an SSW frame.

In a fourth embodiment, different SSW slots may be defined depending on the type of the SSW frame. FIG. 6 illustrates an example in which an SSW slot is defined according to the type of an SSW frame.

SSW-I is transmitted in the original SSW slot. An additional SSW slot for SSW-II is configured. Although it is shown that the additional SSW slot precedes the original SSW slot, the additional SSW slot may follow the original SSW slot.

Additional A-BFT length and additional FSS may be defined to define the additional SSW slot.

Figure 7:
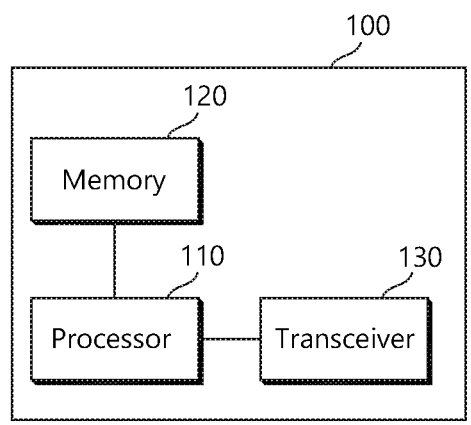
FIG. 7 is a block diagram illustrating a device to implement an embodiment of the present invention.

FIG. 7 is a block diagram illustrating a device to implement an embodiment of the present invention.

The device 100 includes a processor 110, a memory 120, and a transceiver 130.

The memory 120 is connected to the processor 110 and stores various instructions executed by the processor 110. The transceiver 130 is connected to the processor 110 and transmits and/or receives a radio signal. The processor 110 implements proposed functions, processes, and/or methods. In the foregoing embodiments, the operation of the STA or the AP may be implemented by the processor 110. When the foregoing embodiments are implemented in software instructions, the instructions may be stored in the memory 120 and may be executed by the processor 110 to perform the foregoing operation.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for beamforming training in a wireless communication system, the method comprising:
   receiving, by a station (STA), a beacon frame from an access point (AP) during a beacon transmission interval (BTI),
   wherein the beacon frame includes association beamforming training (A-BFT) length representing a number of a plurality of sector sweep (SSW) slots within an A-BFT and an SSW field representing a number of SSW frames allowed per SSW slot, and
   wherein the beacon frame includes information on a type of an SSW frame used in at least one SSW slot of the plurality of SSW slots; and
   transmitting, by the STA, an SSW frame according to the type of the SSW frame in an SSW slot having succeeded in a random backoff among the plurality of SSW slots during the A-BFT,
   wherein the type of the SSW frame indicates one of a first-type SSW frame or a second-type SSW frame, and the first-type SSW frame and the second-type SSW frame have different sizes, and
   wherein the SSW field indicates the first-type SSW frame when a value of the SSW field is a specified value or less, and the SSW field indicates the second-type SSW frame when the value of the SSW field is greater than the specified value.

2. The method of claim 1, wherein the first-type SSW frame has a larger size than that of the second-type SSW frame.

3. The method of claim 1, wherein a value of the SSW field is differently interpreted depending on the type of the SSW frame.

4. The method of claim 1, wherein the plurality of SSW slots includes at least one first SSW slot for the first-type SSW frame and at least one second SSW slot for the second-type SSW frame.

5. The method of claim 4, wherein the beacon frame comprises information on the at least one first SSW slot and the at least one second SSW slot.

6. A device for beamforming training in a wireless communication system, the device comprising:
   a transceiver to transmit and receive a radio signal; and
   a processor connected to the transceiver and configured to:
   control the transceiver to receive a beacon frame from an access point (AP) during a beacon transmission interval (BTI),
   wherein the beacon frame includes association beamforming training (A-BFT) length representing a number of a plurality of sector sweep (SSW) slots within an A-BFT and an SSW field representing a number of SSW frames allowed per SSW slot, and
   wherein the beacon frame includes information on a type of an SSW frame used in at least one SSW slot of the plurality of SSW slots; and
   control the transceiver to transmit an SSW frame according to the type of the SSW frame in an SSW slot having succeeded in a random backoff among the plurality of SSW slots during the A-BFT,
   wherein the type of the SSW frame indicates one of a first-type SSW frame or a second-type SSW frame, and the first-type SSW frame and the second-type SSW frame have different sizes, and wherein the SSW field indicates the first-type SSW frame when a value of the SSW field is a specified value or less, and the SSW field indicates the second-type SSW frame when the value of the SSW field is greater than the specified value.

7. The device of claim 6, wherein the first-type SSW frame has a larger size than that of the second-type SSW frame.

8. The device of claim 6, wherein a value of the SSW field is differently interpreted depending on the type of the SSW frame.

9. The device of claim 6, wherein the plurality of SSW slots includes at least one first SSW slot for the first-type SSW frame and at least one second SSW slot for the second-type SSW frame.

* * * * *